US011056977B2

(12) United States Patent
Zhao et al.

(10) Patent No.: US 11,056,977 B2
(45) Date of Patent: Jul. 6, 2021

(54) HIGHLY INTEGRATED SWITCHING POWER SUPPLY AND CONTROL CIRCUIT

(71) Applicant: Wuxi Chipown Microelectronics Co., Ltd., Wuxi (CN)

(72) Inventors: Changshen Zhao, Wuxi (CN); Haisong Li, Wuxi (CN); Wenliang Liu, Wuxi (CN); Hao Qin, Wuxi (CN); Yangbo Yi, Wuxi (CN); Kuang Wang, Wuxi (CN)

(73) Assignee: Wuxi Chipown Microelectronics Co., Ltd., Jiangsu (CN)

( * ) Notice: Subject to any disclaimer, the term of this patent is extended or adjusted under 35 U.S.C. 154(b) by 0 days.

(21) Appl. No.: 16/712,656

(22) Filed: Dec. 12, 2019

(65) Prior Publication Data

US 2021/0111630 A1    Apr. 15, 2021

(30) Foreign Application Priority Data

Oct. 12, 2019   (CN) .......................... 201910966570.9

(51) Int. Cl.
*H02M 3/335* (2006.01)
*H02M 3/156* (2006.01)

(52) U.S. Cl.
CPC ....... *H02M 3/33507* (2013.01); *H02M 3/156* (2013.01)

(58) Field of Classification Search
CPC . H02M 3/335–337; H02M 3/156–158; H02M 2001/003–0045;

(Continued)

(56) References Cited

U.S. PATENT DOCUMENTS 5,862,045 A * 1/1999 Halamik ........... H02M 3/33515
363/21.13
5,973,939 A   10/1999 Tan
(Continued)

FOREIGN PATENT DOCUMENTS

CN     102832791 A    12/2012
CN     104578790 A     4/2015
(Continued)

OTHER PUBLICATIONS

First Chinese Office Action regarding Application No. 201910966570.9 dated Apr. 27, 2020. English translation provided by Unitalen Attorneys at Law.

*Primary Examiner* — Thienvu V Tran
*Assistant Examiner* — Nusrat Quddus
(74) *Attorney, Agent, or Firm* — Harness, Dickey & Pierce, P.L.C.

(57) ABSTRACT

A highly integrated switching power supply and a control circuit are provided. The switching power supply includes a transformer, the transformer comprises a primary winding, a secondary winding and an auxiliary winding, and the control circuit includes: a power switch transistor, configured to control disconnection and conduction of the primary winding of the transformer; a primary current sampling module, configured to sample a current of the primary winding to generate a sampling voltage; and a voltage stabilization control module, configured to turn on or turn off the power switch transistor according to an input voltage, an output voltage of the switching power supply system, and the sampling voltage.

9 Claims, 8 Drawing Sheets

(58) Field of Classification Search
CPC ... H02M 2001/0058; H02M 2001/322; H02M 2001/325; H02M 2001/385; H02M 2007/4811; H02M 1/32; H02M 1/34; H02M 1/38; H02M 1/14
USPC .................................................. 323/271–289
See application file for complete search history.

(56) References Cited

U.S. PATENT DOCUMENTS

| | | | | |
|---|---|---|---|---|
| 8,022,683 | B2* | 9/2011 | Thompson | H02M 3/158 323/285 |
| 8,630,103 | B2 | 1/2014 | Baurle et al. | |
| 9,024,541 | B2* | 5/2015 | Xie | H05B 33/08 315/307 |
| 9,287,786 | B2 | 3/2016 | Baurle et al. | |
| 9,520,794 | B2* | 12/2016 | Maru | H02M 3/335 |
| 9,800,164 | B1* | 10/2017 | Li | H02M 1/36 |
| 9,812,945 | B2 | 11/2017 | Li et al. | |
| 9,935,556 | B1* | 4/2018 | Rana | H02M 3/33507 |
| 9,985,543 | B1* | 5/2018 | Yi | H02M 3/24 |
| 10,312,816 | B1* | 6/2019 | Zhao | H02M 1/32 |
| 2004/0155639 | A1* | 8/2004 | Mobers | H02M 3/33523 323/282 |
| 2004/0196055 | A1* | 10/2004 | Pearce | H02M 3/1588 324/713 |
| 2006/0018000 | A1* | 1/2006 | Greer | G02F 1/163 359/265 |
| 2006/0284567 | A1* | 12/2006 | Huynh | H02M 3/33507 315/246 |
| 2006/0285365 | A1* | 12/2006 | Huynh | H02M 3/33523 363/16 |
| 2008/0094047 | A1* | 4/2008 | Huynh | H02M 3/33523 323/282 |
| 2010/0073964 | A1* | 3/2010 | Tatsukawa | H02M 3/33507 363/15 |
| 2011/0095733 | A1* | 4/2011 | Park | H02M 1/4225 323/207 |
| 2011/0101949 | A1* | 5/2011 | Lopata | H02M 3/1588 323/286 |
| 2012/0069611 | A1* | 3/2012 | Yang | H02M 1/4225 363/44 |
| 2012/0320640 | A1* | 12/2012 | Baurle | H02M 3/33515 363/21.17 |
| 2013/0027978 | A1* | 1/2013 | Suzuki | H02M 3/33507 363/15 |
| 2014/0028289 | A1* | 1/2014 | Ohnemus | H02M 3/3353 324/127 |
| 2014/0104895 | A1 | 4/2014 | Baurle et al. | |
| 2014/0268918 | A1* | 9/2014 | Gong | H05B 45/37 363/21.15 |
| 2015/0244275 | A1* | 8/2015 | Hinz | H02M 1/08 363/21.17 |
| 2015/0372586 | A1* | 12/2015 | Wang | H02M 1/4258 363/21.01 |
| 2016/0241068 | A1* | 8/2016 | Zhao | H02J 7/00 |
| 2016/0336851 | A1* | 11/2016 | Li | H02M 3/335 |
| 2016/0336861 | A1* | 11/2016 | Gritti | H02M 3/33507 |
| 2016/0344282 | A1* | 11/2016 | Lin | H02M 1/4225 |
| 2016/0358705 | A1* | 12/2016 | Lin | H01F 27/06 |
| 2016/0359421 | A1* | 12/2016 | Lin | H02M 3/33523 |
| 2017/0077695 | A1* | 3/2017 | Li | H02H 7/1203 |
| 2017/0117809 | A1* | 4/2017 | Lin | H02M 1/08 |
| 2017/0358991 | A1* | 12/2017 | Basso | H02M 3/33523 |
| 2018/0034378 | A1* | 2/2018 | Lin | H02M 1/08 |
| 2018/0048164 | A1* | 2/2018 | Zhang | H02J 7/007 |
| 2018/0054128 | A1* | 2/2018 | Li | H02M 3/33507 |
| 2018/0062529 | A1* | 3/2018 | Song | H02M 3/33507 |
| 2018/0262096 | A1* | 9/2018 | Hsu | H02M 3/33507 |
| 2018/0287479 | A1* | 10/2018 | Li | H02M 3/33507 |
| 2019/0103807 | A1* | 4/2019 | Chen | H02H 7/125 |

FOREIGN PATENT DOCUMENTS

| | | |
|---|---|---|
| CN | 104821708 A | 8/2015 |
| CN | 206835006 U | 1/2018 |
| CN | 108718154 A | 10/2018 |
| CN | 109951178 A | 6/2019 |

* cited by examiner

HIGHLY INTEGRATED SWITCHING POWER SUPPLY AND CONTROL CIRCUIT

CROSS-REFERENCE TO RELATED APPLICATIONS

This application claims the benefit of priority to Chinese Patent Application No. 201910966570.9, titled "HIGHLY INTEGRATED SWITCHING POWER SUPPLY AND CONTROL CIRCUIT", filed on Oct. 12, 2019, the entire disclosure of which is incorporated herein by reference.

TECHNICAL FIELD

The disclosure generally relates to an electronic circuit field, and more particularly, to a highly integrated switching power supply and a control circuit.

BACKGROUND

FIG. 1 schematically illustrates a simplified structural diagram of a conventional switching power supply system, which includes a transformer T11, an input circuit, and an output circuit. The input circuit is coupled with a primary winding Np and an auxiliary winding Na of the transformer T11, and the output circuit is coupled with a secondary winding Ns of the transformer T11. The input circuit includes: a power supply diode D12, a filter capacitor C1, a power supply capacitor EC11, an upper voltage feedback resistor R11 and a lower voltage feedback resistor R12, a primary current sampling resistor R13, a startup resistor R14, and a control circuit 100. The control circuit 100 is integrated in the chip and includes a plurality of pins. The output circuit includes an output capacitor EC12, an output diode D13, and a preload resistor R16.

In the switching power supply system shown in FIG. 1, the control circuit 100 detects a voltage signal on its FB pin, which characterizes an output voltage; and simultaneously detects a voltage signal on its CS pin, wherein the voltage on the CS pin characterizes the primary current, and the control circuit 100 controls to turn on or turn off of the power switch transistor according to the voltage signals on the two pins to achieve a constant output voltage. An output voltage feedback signal on the FB pin is obtained from a division voltage between the upper voltage feedback resistor R11 and the lower voltage feedback resistor R12, and a primary current signal on the CS pin is obtained by the primary current sampling resistor R13; if the primary current sampling resistor R13, the upper voltage feedback resistor R11 or the lower voltage feedback resistor R12 is shorted or opened, the control circuit 100 cannot obtain an accurate output voltage signal or primary current information of the transformer, and the output of constant voltage function cannot be realized. Especially when the lower voltage feedback resistor R12 is abnormally shorted or opened, an abnormal output voltage feedback signal may cause the output voltage too high or too low to go beyond the output specification, which may cause damages to the load.

The conventional switching power supply system has a complicated peripheral design, a high system cost, too many components and low reliability. Therefore, a new switching power supply is needed to reduce system complexity.

SUMMARY

To simplify a system, embodiments of the present disclosure provide a control circuit for a switching power supply system, wherein the switching power supply system includes a transformer, the transformer includes a primary winding, a secondary winding and an auxiliary winding, and the control circuit includes: a power switch transistor, configured to control disconnection and conduction of the primary winding of the transformer; a primary current sampling module, configured to sample a current of the primary winding to generate a sampling voltage; and a voltage stabilization control module, configured to turn on or turn off the power switch transistor according to an input voltage, an output voltage of the switching power supply system, and the sampling voltage.

In some embodiments, the primary current sampling module includes: a sampling transistor, in parallel with the power switch transistor, configured to generate a current sampling signal, wherein the current sampling signal is proportional to a current flowing through the power switch transistor; and a current detecting module, configured to generate the sampling voltage according to the current sampling signal.

In some embodiments, the current detecting module includes: a source follow module, coupled with the sampling transistor and configured to generate a sample follow signal according to the current sampling signal; and a current mirror, configured to generate the sampling voltage according to the sample follow signal.

In some embodiments, the voltage stabilization control module includes: a feedback signal detecting module, configured to generate a feedback signal, wherein the feedback signal is related to the output voltage of the switching power supply system; and a turn-off duration calculating module, configured to calculate an off-time duration of the power switch transistor according to an output of the feedback signal detecting module and an off-time point of the power switch transistor.

In some embodiments, the feedback signal detecting module further includes: a resistance adjusting module, configured to generate the feedback signal by adjusting a resistance value connected into the feedback signal detecting module according to the resistance control signal when the power switch transistor is turned off, wherein the feedback signal is related with the output voltage of the switching power supply system, and the feedback signal is corresponding to the resistance control signal.

In some embodiments, the resistance adjusting module includes: a second feedback resistor module, including an RC filter circuit and a plurality of lower feedback resistors connected in parallel, wherein each of the plurality of lower feedback resistors is controlled by a resistance control switch; and a decoding and encoding module, configured to receive the resistance control signal and output a switch control signal to a plurality of resistance control switches to turn on or off all or part of the plurality of resistance control switches.

In some embodiments, the feedback signal detecting module further includes: an input feedback module, configured to output an input voltage follow signal when the power switch transistor is turned on, wherein the input voltage follow signal is related to the input voltage of the switching power supply system.

In some embodiments, the control circuit further includes: a power supply startup module, configured to charge a power supply capacitor in the switching power supply system through the primary winding, or configured to charge the power supply capacitor through the primary winding and the auxiliary winding when the switching power supply system starts; and configured to charge the power supply capacitor through the auxiliary winding of the transformer when a voltage of the power supply capacitor is greater than a chip startup threshold.

In some embodiments, the power supply startup module includes: a voltage comparing module, configured to generate a power supply division voltage according to a voltage on the power supply capacitor, to compare the power supply division voltage with a reference voltage, and to output a voltage comparison result; a primary connecting module, configured to connect the primary winding to the power supply capacitor according to the voltage comparison result; and an auxiliary connecting module, configured to connect the auxiliary winding to the power supply capacitor according to the voltage comparison result.

Embodiments of the present disclosure further provides switching power supply system, including: a transformer, including a primary winding, an auxiliary winding and a secondary winding, configured to perform a voltage-convert on an input voltage from the primary winding, and output an output voltage through the secondary winding; wherein the switching power supply system further includes: the control circuit, configured to control the conduction and disconnection of the primary winding of the transformer such that the switching power supply system outputs at a constant voltage.

Compared with a conventional technology, embodiments of the present disclosure has following advantages.

Embodiments of the present disclosure provide a switching power supply system, and the switching power supply system includes a control circuit, configured to sample a primary current on a primary winding of the transformer to obtain a sampling voltage; to obtain a division voltage from a first feedback resistor and a second feedback resistor module included in the control circuit as a feedback signal; and to control charging and discharging of the transformer according to the sampling voltage and the feedback signal. Therefore, compared with the existing switching power supply system, the switching power supply system in the embodiment of the present disclosure saves five components, mainly including a lower voltage feedback resistor, a filter capacitor, a VDD power supply diode, a primary current sampling resistor, and a startup resistance. The system is simplified with a high reliability and low cost.

Further, the control circuit includes a current detecting module. Therefore, even if the primary current sampling resistor is not disposed outside the control circuit, the primary current can be accurately detected, and a loss caused by primary side current sampling resistance loss is eliminated, efficiency can be improved and a constant current output control can be realized.

Further, the feedback signal detecting module includes a resistance adjusting module, configured to generate the feedback signal by adjusting a resistance value connected into the feedback signal detecting module according to the resistance control signal when the power switch transistor is turned off, wherein the feedback signal is related with the output voltage of the switching power supply system, and the feedback signal is corresponding to the resistance control signal. Through integrating the second feedback resistor module, a resistance value of the integrated second feedback resistor module can be dynamically adjusted according to the resistance control signal received by the control circuit to output different feedback signals. In addition, the switching power supply system can accurately detect the output voltage and achieve a constant output voltage control without the feedback resistor outside the control circuit.

Further, the feedback signal detecting module further includes: an input feedback module, configured to clamp a feedback pin to a zero potential when the power switch transistor is turned on, and output an input voltage follow signal, wherein the input voltage follow signal is proportional to the input voltage. Through detecting the input voltage signal to compensate the output of the feedback signal detecting module, and an output voltage or an output current is accurately controlled under different input voltages.

Further, the control circuit further includes: the power supply startup module, configured to charge a power supply capacitor in the switching power supply system through the primary winding, or configured to charge the power supply capacitor through the primary winding and the auxiliary winding when the switching power supply system is started; and configured to charge the power supply capacitor through the auxiliary winding of the transformer when a voltage of the power supply capacitor is greater than a chip startup threshold. In embodiments of the present disclosure, a power supply diode is not required outside the control circuit, and a chip is supplied using the primary winding and the auxiliary winding of the transformer. Therefore, the switching power supply system has a faster starting speed and a stable performance.

DETAILED DESCRIPTION

Figure 1:
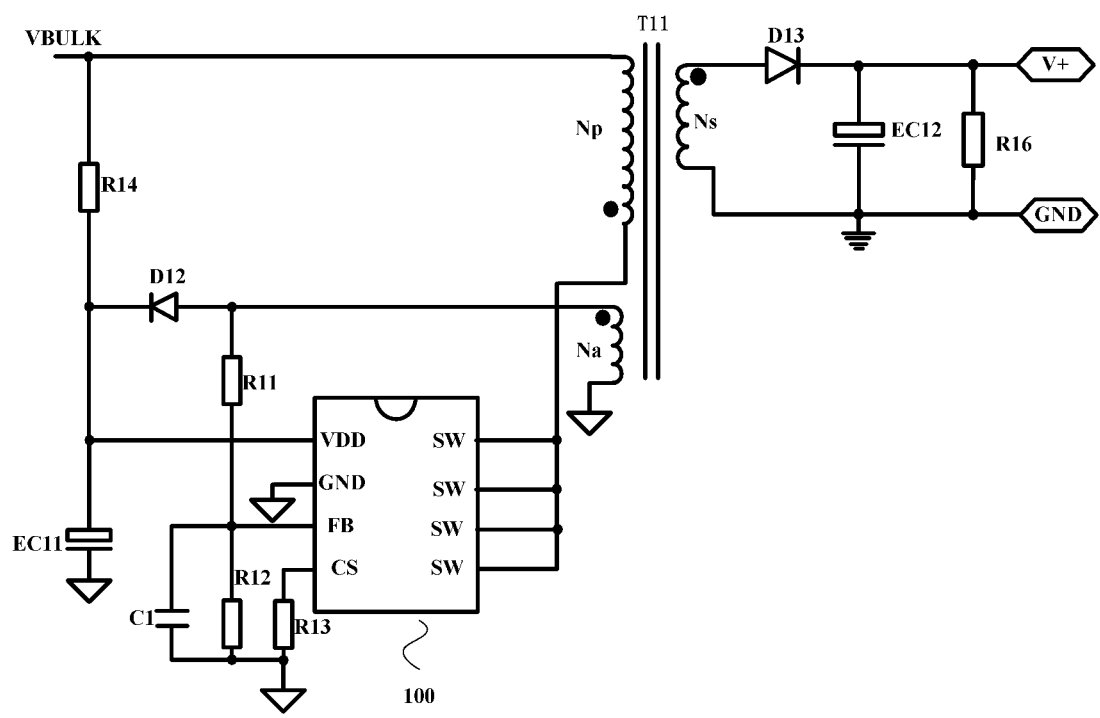
FIG. 1 schematically illustrates a structural diagram of an existing switching power supply.
Figure 2:
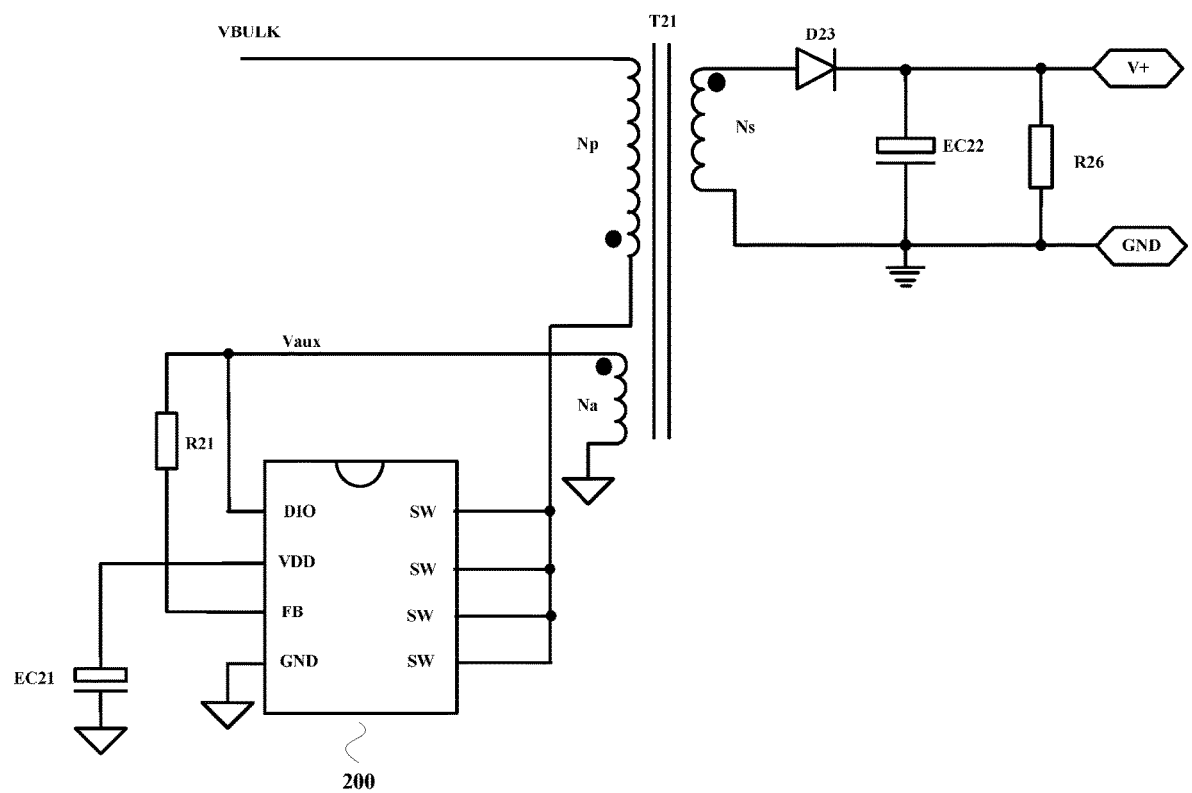
FIG. 2 schematically illustrates a structural diagram of a switching power supply according to an embodiment of the present disclosure.

Referring to FIG. 2, FIG. 2 schematically illustrates a structural diagram of a switching power supply according to an embodiment of the present disclosure.

The switching power supply system shown in FIG. 2 includes a transformer T21, an input circuit, and an output circuit. The input circuit is coupled with a primary winding Np and an auxiliary winding Na of the transformer T21, and the output circuit is coupled with a secondary winding Ns of the transformer T21. The output circuit includes an output capacitor EC22, an output diode D23, and a preload resistor R26.

The input circuit includes: a first feedback resistor R21 having a first end coupled with the auxiliary side winding, a second end coupled with a feedback pin (FB pin) of the control circuit, and a supply capacitor EC21, configured to supply power source to the control circuit; and a control circuit 200, configured to sample a primary current on the primary winding Np of the transformer to obtain a sampling voltage, to obtain a division voltage between the first feedback resistor R21 and a second feedback resistor module included in the control circuit 200 as a feedback signal, and to charge or discharge the transformer according to the sampling voltage and the feedback signal.

Specifically, a first end of the auxiliary winding Na of the transformer T21 is coupled with a DIO pin of the control circuit 200 and a first end of the first feedback resistor R21; the primary winding Np of the transformer has a first end receiving the input signal VBULK and a second end coupled with a SW pin of the control circuit 200; a second end of the first feedback resistor R21 is coupled with the FB pin of the control circuit 200; the power supply capacitor EC21 has a first electrode coupled with a VDD pin of the control circuit 200; and a second electrode of the supply capacitor EC21, a second end of the auxiliary winding Na, and a GND pin of the control circuit 200 are all grounded.

The control circuit 200 samples a primary current on the primary winding of the transformer to obtain a sampling voltage; obtain a division voltage from a first feedback resistor and the second feedback resistor module included in the control circuit as a feedback signal; and control charging and discharging of the transformer according to the sampling voltage and the feedback signal. Therefore, compared with the existing switching power supply system, the switching power supply system in the embodiment of the present disclosure saves five components outside the control circuit 200, which simplifies the switching power supply system with a high reliability and low cost.

Figure 3:
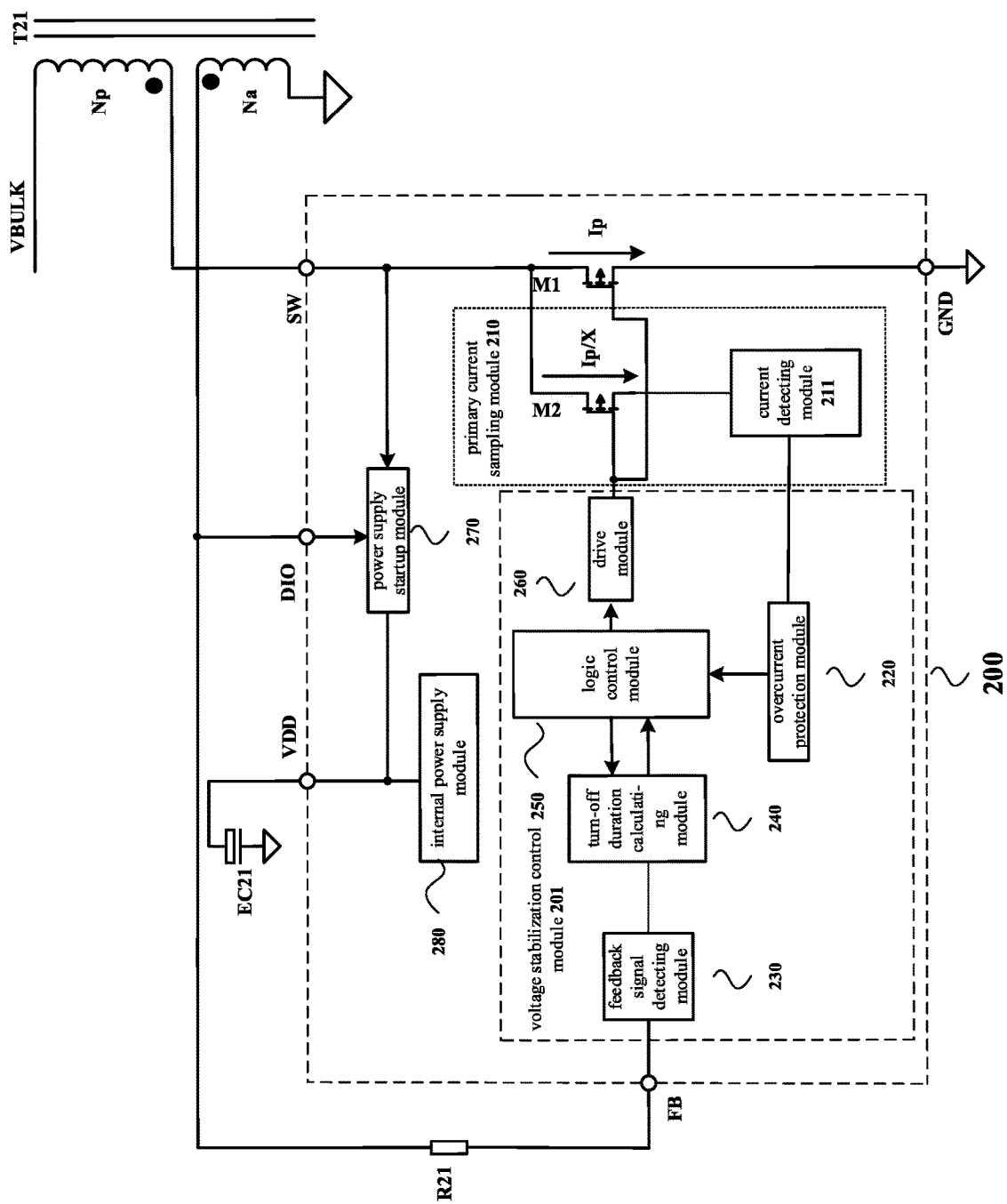
FIG. 3 schematically illustrates a structural diagram of a switching power supply according to an embodiment of the present disclosure.

Referring to FIG. 3, FIG. 3 schematically illustrates a structural diagram of a switching power supply according to an embodiment of the present disclosure The structural diagram of the switching power supply is shown in FIG. 3, wherein the switching power supply system includes a transformer T21, an input circuit, and an output circuit (not shown). The input circuit is coupled with a primary winding Np and an auxiliary winding Na of the transformer T21.

The input circuit includes: a first feedback resistor R21 having a first end coupled with the auxiliary side winding, a second end coupled with a feedback pin (FB pin) of the control circuit, and a supply capacitor EC21, configured to supply power to the control circuit; and a control circuit 200, configured to sample a primary current on the primary winding Np of the transformer to obtain a sampling voltage, to obtain a division voltage between the first feedback resistor R21 and a second feedback resistor module included in the control circuit 200 as a feedback signal, and to charge or discharge the transformer according to the sampling voltage and the feedback signal.

As shown in FIG. 3, the control circuit 200 includes a power switch transistor M1, a primary current sampling module 210, a voltage stabilization control module 201, a power supply startup module 270, and an internal power supply module 280.

The voltage stabilization control module 201 is configured to turn on or turn off the power switch transistor according to an input voltage, an output voltage of the switching power supply system, and the current sampling signal. The voltage stabilization control module 201 includes an overcurrent protection module 220, a feedback signal detecting module 230, a turn-off duration calculating module 240, a logic control module 250, and a drive module 260.

In some embodiments, the power switch transistor M1 is configured to control the disconnection and conduction of the primary winding Np, so as to control charging and discharging of the primary winding Np. The primary current sampling module 210 is configured to sample a primary current on the power switch M1 to generate a sampling voltage, and the control circuit 200 turns off the power switch M1 according to the sampling voltage.

In some embodiments, the primary current sampling module 210 includes: a sampling transistor M2, in parallel with the power switching transistor M1, configured to generate a current sampling signal, wherein the current sampling signal is proportional to the primary current; and a current detecting module 211, configured to detect the current sampling signal and output a sampling voltage, wherein the sampling voltage is positively correlated with the current sampling signal. The power switch transistor and the sampling transistor have a longitude ratio of X:1 (X is greater than 1). Therefore, if a current flowing through the power switch transistor M1 is Ip, a current flowing through the sampling transistor M2 is Ip/X.

In some embodiments, the overcurrent protection module 220 is configured to compare the primary current detected by the current detecting module 211 (i.e., compare the sampling voltage output by the current detecting module 211) with a first threshold, and output a first comparison result to the logic control module 250 outputs. If the sampling voltage is greater than the overcurrent threshold, the logic control module 250 controls the drive module 260 to send a pulse width modulation (PWM) signal to turn off the power switch transistor M1, thereby achieving a control of the power switch transistor M1 from an on state to an off state.

The feedback signal detecting module 230 is configured to generate a feedback signal which is related to an output voltage of the switching power supply system. Specifically, the feedback signal detecting module 230 detects a feedback signal at the FB pin, and when the power switch transistor M1 is turned on, generates an input voltage follow signal according to an input voltage received by the primary winding Np. Moreover, the turn-off duration calculating module 240 is configured to calculate a turn-off duration of the power switch transistor M1 according to the output of the feedback signal detecting module 230 and a start off-time point of the power switch transistors M1. The turn-off duration calculating module 240 obtains a start off-time point of the power switch transistors M1 from the logic control module 250. The turn-off duration calculating module 240 calculates a turn-off duration of the power switch transistor M1 of a current period according to the feedback signal, and adjusts the turn-off duration of the next period according to the input voltage follow signal. The turn-off duration calculating module 240 compares the turn-off duration of the power switch transistor M1 with a second threshold, and outputs a second comparison result to the logic control module 250. If the turn-off duration of the power switch transistor M1 is greater than the second threshold, the logic control module 250 controls the drive module 260 to transmit a PWM signal to turn on the power switch transistor M1, thereby achieving a control of the power switch transistor M1 from an off state to an on state.

Referring to FIG. 2 and FIG. 3, after the power switch transistor M1 is turned off, the primary winding Np of the transformer T21 is discharged, and the output diode D23 is turned on. Therefore, the output voltage of the switching power supply system rises. After the power switch transistor M1 is turned on, the primary winding Np of the transformer T21 is charged, the output diode D23 is turned off, and the output capacitor EC21 supplies power to an output end of the switching power supply system. Therefore, the output voltage of the switching power system drops. A constant voltage control or a constant current control of the output is realized by controlling a duty ratio of the power switch transistor M1 to prevent the output voltage from being too high or too low.

The power supply startup module is configured to charge a power supply capacitor EC21 in the switching power supply system through the primary winding Np, or configured to charge the power supply capacitor through the primary winding Np and the auxiliary winding Na when the switching power supply system is started; and configured to charge the power supply capacitor EC21 through the auxiliary winding Na of the transformer when a voltage of the power supply capacitor is greater than a chip startup threshold. The internal power module 280 is coupled with the power supply capacitor EC21 and is configured to supply power to components in the control circuit 200.

In some embodiments, the power supply startup module 270 includes: a voltage comparing module, configured to generate a power supply division voltage according to a voltage on the power supply capacitor, to compare the power supply division voltage with a reference voltage, and to output a voltage comparison result; a primary connecting module, configured to connect the primary winding to the power supply capacitor according to the voltage comparison result; and an auxiliary connecting module, configured to connect the auxiliary winding to the power supply capacitor according to the voltage comparison result.

Specifically, the power supply startup module 270 has an output end coupled with the VDD pin of the control circuit 200 and a first end of the internal power supply module 280, a first input end coupled with the DIO pin of the control circuit 200, and a second input end coupled with the SW pin of the control circuit 200, a drain of the sampling transistor M2, and a drain of the power switch transistor M1. The feedback signal detecting module 230 has an input end coupled with the FB pin of the control circuit 200, and an output end coupled with the input end of the turn-off duration calculating module 240. The logic control module 250 has a first input end coupled with an output end of the turn-off duration calculating module 240, a second input end coupled with coupled with an output end of the overcurrent protection module 220, and an output end of the logic control module 250 coupled with an input end of the drive module 260; an output end of the driving module 260 is coupled with a gate of the sampling transistor M2 and a gate of the power switching transistor M1; a source of the sampling transistor M2 is coupled with an input end of a current detecting module 211; the output end of the current detecting module 211 is coupled with an input end of the overcurrent protection module 220; and a source of the power switch transistor M1 and the GND pin of the control circuit 200 are both grounded.

Figure 4:
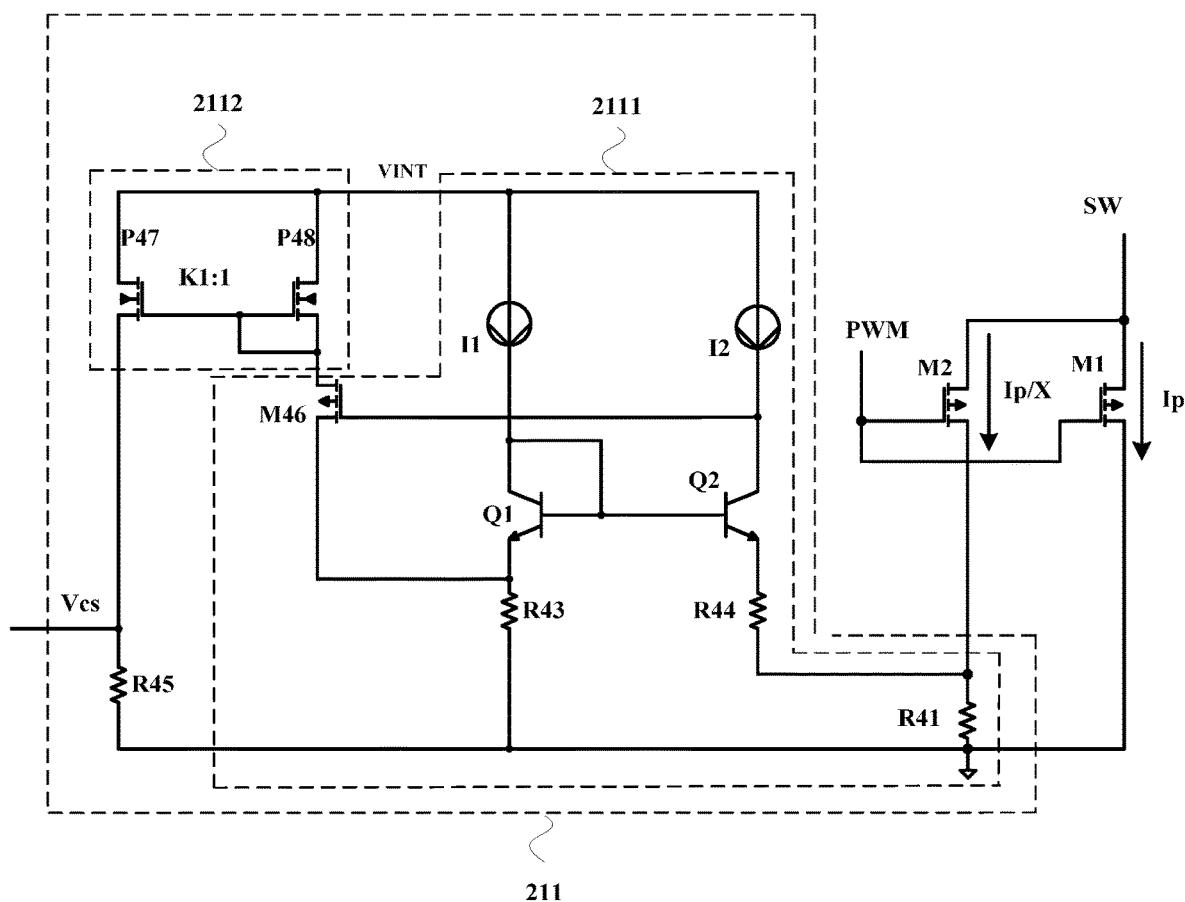
FIG. 4 schematically illustrates a structural diagram of a primary current sampling module according to an embodiment of the present disclosure.

Referring to FIG. 4, FIG. 4 schematically illustrates a structural diagram of a primary current sampling module according to an embodiment of the present disclosure.

FIG. 4 shows the power switch transistor M1 and the primary current sampling module. The primary current sampling module includes a sampling transistor M2 and a current detecting module 211.

In some embodiments, the sampling transistor M2 is coupled in parallel with the power switch transistor M1, and is configured to generate the current sampling signal which is proportional to the current flowing through the power switch transistor M1. Specifically, the control circuit 200 detects the primary current of the transformer through the primary current sampling module. The power switch transistor M1 and the sampling transistor M2 are connected in parallel, and have a longitude ratio of X:1. Therefore, a current flowing through the sampling transistor M2 is 1/X times s current flowing through the power switching transistor M1.

The current detecting module 211 includes a source follow module 2111, a current mirror 2112 and a sampling output resistor R45. The source follow module 2111 is coupled with the sampling transistor M2 and is configured to generate a sample follow signal according to the current sampling signal; and the current mirror 2112 is configured to generate the sampling voltage according to the sampling follow signal.

Specifically, the source follow module 2111 includes a sampling resistor R41, a first resistor R43, a second resistor R44, a first transistor Q1, a second transistor Q2, a first current source I1, a second current source I2, and a source follow NMOS (N-type Metal Oxide Semiconductor Field Effect Transistor) M46. The current mirror 2112 includes a first PMOS (P-type Metal Oxide Semiconductor Field Effect Transistor) P47 and a second PMOS P48.

Referring to FIG. 4, the second resistor R44 has a first end coupled with an emitter of the second transistor Q2, and a second end coupled with the source of the sampling transistor M2 and a first end of the resistor R41; the second transistor Q2 has a base coupled with a base and a collector of the transistor Q1 and a first end of the first current source I1, and a collector coupled with a first end of the second current source I2 and a gate of the source follow NMOS M46; an emitter of the first transistor Q1 and a first end of the first resistor R43, the a source of the source follow NMOS M46; a drain of the second PMOS P48 is coupled with a gate of the second PMOS P48, a drain of the source follow NMOS M46, a gate of the first PMOS P47; a drain of the first PMOS P47 is coupled with a first end of a sampling output resistor R45 and an output end of the current detecting module 211; a second end of the sampling output resistor R45, a second end of the sampling resistor R41, and a second end of the first resistor R43 are grounded; sources of the first PMOS P47 and the second PMOS P48, a second end of the first current source I1 and a second end of the second current source I2 are all coupled with a chip internal voltage VINT; a gate of the sampling transistor M2 is coupled with a gate of the power switch transistor M1, and receives an output signal PWM of the drive module; and a drain of the sampling transistor M2 is coupled with and a drain of the power switch transistor M1. The first current source I1 and the second current source I2 are identical in structure, the first resistor R43 and the second resistor R44 have a same resistance value, and the power switch transistor M1 and the sampling transistor M2 have a longitude ratio of X:1.

In the embodiment shown in FIG. 4, emitter potentials of the first transistor Q1 and the second transistor Q2 are constantly equal. The sampling voltage Vcs output by the current detecting module 211 is proportional to the power switch transistor current Ip, and the Vcs voltage characterizes a primary current signal, and can be expressed by the following formula.

$$V_{CS} = \frac{R41}{R43} * R45 * K1 * \left(I2 + \frac{Ip}{X}\right) \approx \frac{R41}{R43} * R45 * K1 * \frac{Ip}{X}$$

K1 is an amplification coefficient of the current mirror 2112.

The control circuit 200 includes the sampling transistor M2 and a current detecting module 211. Therefore, even if a primary current sampling resistor is not disposed outside the control circuit, the primary current can be accurately detected and a constant output current control may be realized.

Figure 5:
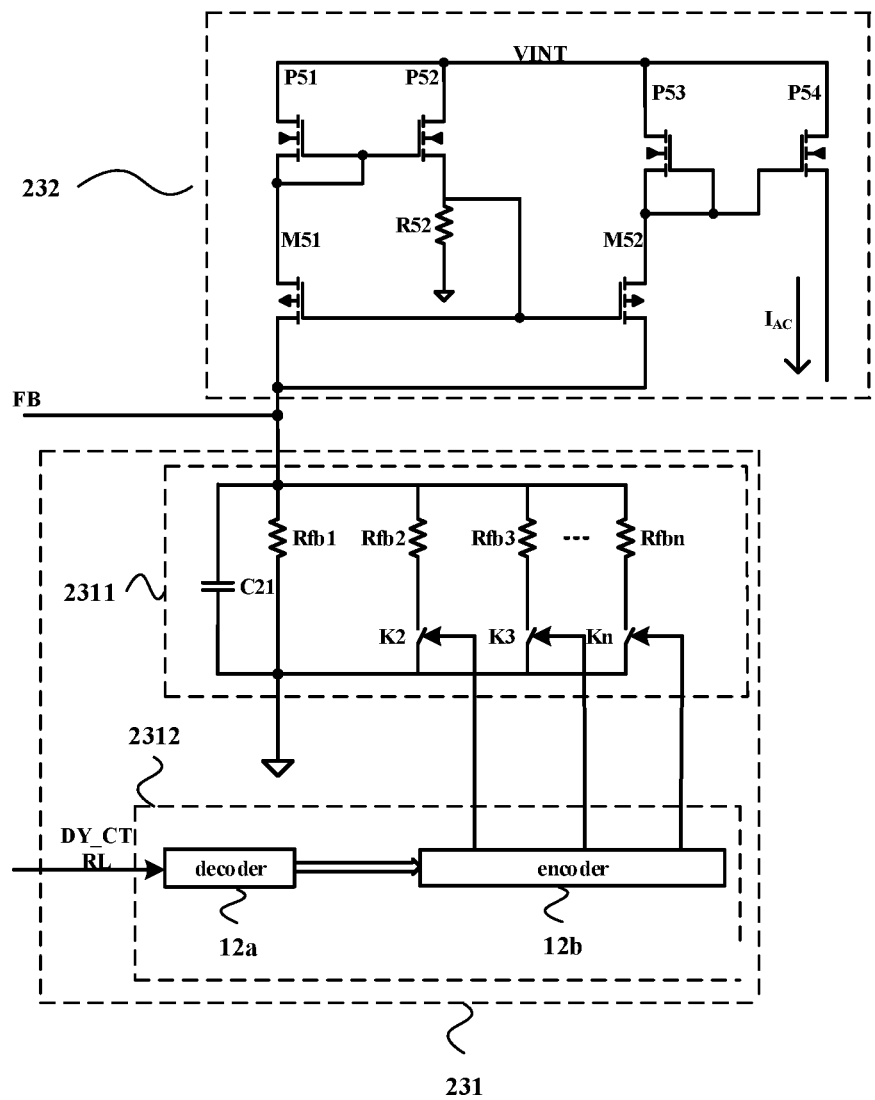
FIG. 5 schematically illustrates a structural diagram of a feedback signal detecting module according to an embodiment of the present disclosure.

FIG. 5 schematically illustrates a structural diagram of a feedback signal detecting module according to an embodiment of the present disclosure.

In some embodiments, the feedback signal detecting module 230 is configured to generate the feedback signal, where the feedback signal is a division voltage between the first feedback resistor R21 and a resistance adjusting module 231 in the control circuit 200, the control circuit 200 turn on the power switch transistor M1 according to the feedback signal.

The FB pin of the control circuit 200 is connected to the secondary winding Na of the transformer T21 through the first feedback resistor R21. The primary winding Np is discharged when the power switch M1 is turned off, the output diode D23 is in an on state, and the auxiliary winding Na can couple a portion of the output voltage to the FB pin of the control circuit 200 through the secondary winding Ns of the transformer T21. Therefore, the feedback signal at the FB pin can characterize the output voltage.

In some embodiments, the feedback signal detecting module 230 includes: a resistance adjusting module 231, configured to generate the feedback signal by adjusting a resistance value connected into the feedback signal detecting module 230 according to the resistance control signal DY_CTRL, wherein the feedback signal is related with the output voltage of the switching power supply system, and the feedback signal is corresponding to the resistance control signal DY_CTRL. The feedback signal is a division voltage between the second feedback resistor module 2311 and the first feedback resistor R21. The feedback signal detecting module 230 further includes: an input feedback module 232, configured to clamp the FB pin to a zero potential and output an input voltage follow signal when the power switch transistor M1 is turned on, wherein the input voltage follow signal is related to an input voltage of the switching power supply system. The resistance control signal DY_CTRL is a communication signal received by the control circuit 200 for dynamically adjusting the feedback signal.

In some embodiments, the resistance adjusting module 231 includes a second feedback resistance module 2311, including an RC filter circuit and a plurality of lower feedback resistors connected in parallel, wherein each of the plurality of lower feedback resistors is controlled by a resistance control switch. The RC filter circuit includes a first lower feedback resistor Rfb1 and a parallel capacitor and a parallel capacitor C21. The plurality of lower feedback resistors include a second lower feedback resistor Rfb2 to an N-th lower feedback resistor Rfbn, and each lower feedback resistor is connected in series with one of a plurality of resistance control switches (K2-Kn) respectively, N is a positive integer and is greater than or equal to 2. The resistance adjusting module 231 further includes a decoding and encoding module 2312, configured to receive the resistance control signal and output a switch control signal to the plurality of resistance control switches (K2-Kn) to turn on or off all or part of the plurality of resistance control switches (K2-Kn). The first feedback resistor Rfb1 to the N-th lower feedback resistor Rfbn are all connected in parallel with the parallel capacitor C21.

Specifically, the decoding and encoding module 2312 includes a decoder 12a and an encoder. The decoder 12a is configured to decode the resistance control signal DY_CTRL, and the encoder 12b re-encodes the decoded signal into a switch control signal that can be recognized by the resistance control switch to turn on or off the plurality of resistance control switches (K2-Kn), thereby adjusting the equivalent resistance of the second feedback resistor module 2312. Through integrating the second feedback resistor module 2311, a resistance value of the integrated second feedback resistor module 2311 can be dynamically adjusted according to the resistance control signal DY_CTRL received by the control circuit 200 to output different feedback signals.

In some embodiments, the feedback signal detecting module 230 is further configured to generate an input voltage follow signal according to the input voltage VBULK received by the primary winding Np, wherein the input voltage following signal proportional to the input voltage VBULK. The control circuit 200 is further configured to adjust the turn-off duration of the power switch transistor M1 in the next period based on the input voltage follow signal.

Specifically, the feedback signal detecting module 230 further includes an input feedback module 232, configured to clamp the FB pin to a zero potential when the power switch transistor M1 is turned on. Specifically, when the power switch transistor M1 is turned on, a voltage value at the FB pin is negative. Gate-source voltages of a first feedback NMOS M51 and a second feedback NMOS M52 are greater than a turn-on threshold voltage (Vgs>Vth), accordingly the first feedback NMOS M51 and the second feedback NMOS M52 are in an on state. The second feedback NMOS M52 mirrors a current in the first feedback NMOS M51, the current flows into an input feedback resistor R52 and raises a gate voltage of the first feedback NMOS M51. Since a current flowing out of the FB pin (−(VBULK*Np)/(Na*R21)) and the current in the first feedback NMOS M51 are fixed (related with the current at the FB pin and a longitude ratio of the first feedback NMOS M51 and the second feedback NMOS M52), and the current in the first feedback NMOS M51 is proportional to the gate-source voltage of the first feedback NMOS M51, accordingly a source voltage (i.e., the voltage at the FB pin) of the first feedback NMOS M51 increases as the gate voltage increases. In conclusion, the resistance of the input feedback resistor R52 can be adjusted to maintain the FB pin at a zero potential.

When the power switch transistor M1 is turned on, the FB pin is clamped to a zero potential, and the input feedback module 232 outputs an input voltage follow signal which is related to the input voltage of the switching power supply system.

Referring to FIG. 3 and FIG. 5, the input feedback module 232 detects the current flowing out of the FB pin, and outputs the input voltage follow signal Iac after a proportional amplification. When the power switch transistor M1 is turned on, an auxiliary winding voltage of the transformer is −(VBULK*Np)/Na, proportional to the input voltage VBULK, a current flowing out of the FB pin is −(VBULK*Np)/(Na*R21), and the input voltage following signal Iac is −(VBULK*Np)/(Na*R21)*M, where M is an amplification coefficient. The input voltage follow signal Iac is proportional to the input voltage VBULK. The turn-off duration calculating module 240 adjusts the turn-off duration of the power switch transistor M1 according to the input voltage follow signal Iac. Specifically, the turn-off duration of the power switch transistor M1 is increased when the input voltage following signal Iac increases. Therefore, the system may output voltage or current constant at a constant level, and the output voltage or current is accurately controlled under different input voltages.

In some embodiments, the input feedback module 232 includes the first feedback NMOS M51, the second feedback NMOS M52, a first feedback PMOS P51, a second feedback PMOS P52, a third feedback PMOS P53, and a fourth feedback PMOS P54 and the input feedback resistor R52. A gate of the first feedback NMOS M51 is coupled with a gate of the second feedback NMOS M52, a drain of the second feedback PMOS P52, and a first end of the input feedback resistor R52; a drain of the first feedback NMOS M51 is coupled with a drain and a gate of the first feedback PMOS P51, and a gate of the second feedback PMOS P52; a drain of the second feedback NMOS M52 is coupled with a gate and drain of the third feedback PMOS P53 a gate, and a gate of the fourth feedback PMOS P4; a drain of the fourth feedback PMOS P54 outputs the input voltage follow signal Iac; sources of the first feedback PMOS P51, the second feedback PMOS P52, the third feedback PMOS P53, and the fourth feedback PMOS P54 are coupled with the chip internal voltage VINT of the control circuit 200; and the second terminal of the input feedback resistor R52 is grounded.

Figure 6:
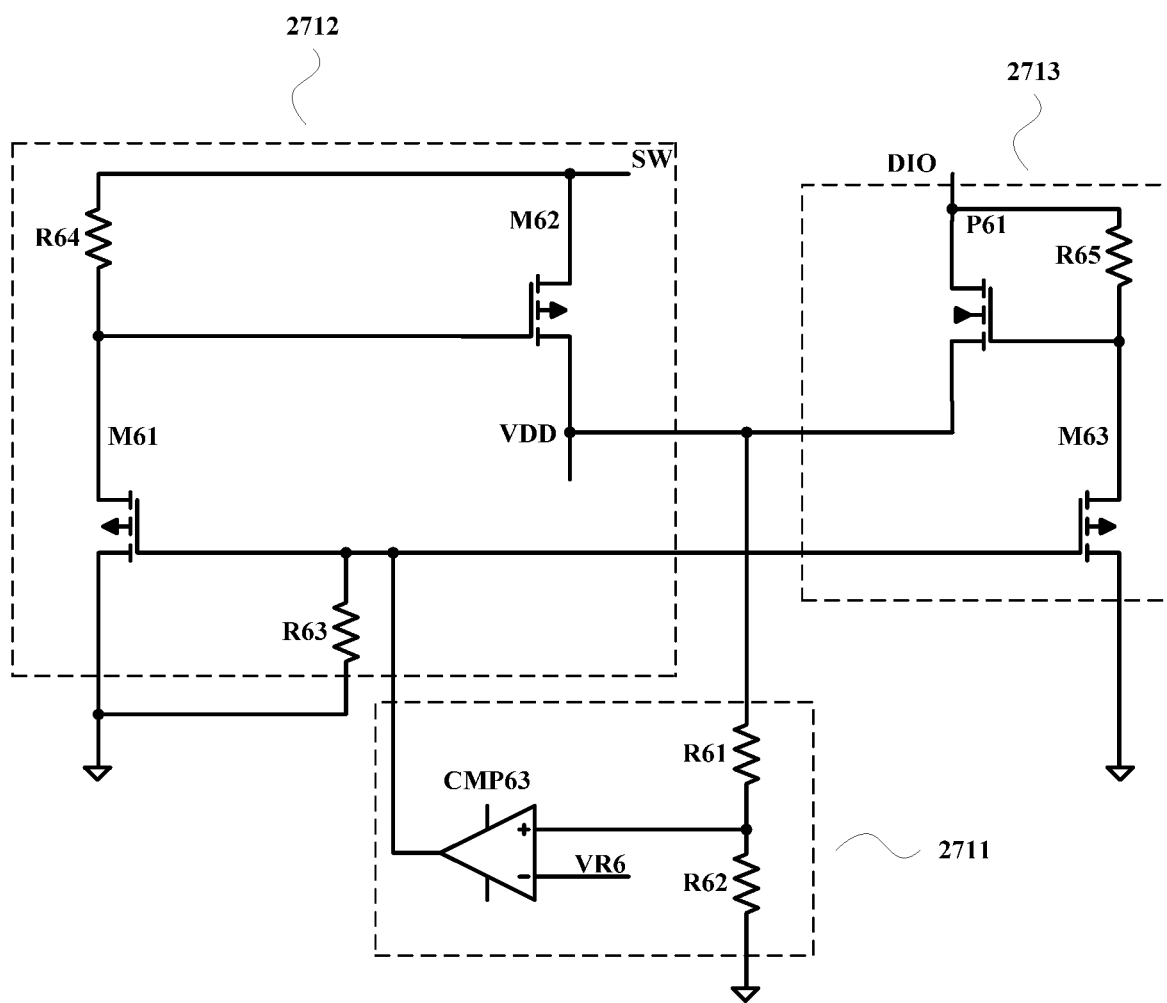
FIG. 6 schematically illustrates a structural diagram of a power supply startup module according to an embodiment of the present disclosure.

Referring to FIG. 6, FIG. 6 schematically illustrates a structural diagram of a power supply startup module according to an embodiment of the present disclosure In the embodiment shown in FIG. 6, the power supply startup module 270 is configured to charge the power supply capacitor in the switching power supply system through the primary winding when the system is started; and is configured to charge the power supply capacitor EC21 through the auxiliary winding when the voltage of the power supply capacitance is greater than the chip startup threshold.

The power supply startup module 270 includes a voltage comparing module 2711, a primary connecting module 2712, and an auxiliary connecting module 2713. The voltage comparing module 2711 is configured to generate a power supply division voltage according to a voltage on the power supply capacitor, to compare the power supply division voltage with a reference voltage VR6, and to output a voltage comparison result, when the power supply division voltage is less than the reference voltage VR6, the voltage comparison result is a low level, and when the power supply division voltage is greater than the reference voltage VR6, the voltage comparison result is a high level. The primary connecting module 2712 is turned on when the voltage comparison result is a low level, and connects the primary winding to the power supply capacitor. The auxiliary connecting module 2713 is turned on when the voltage comparison result is a high level, and connects the auxiliary winding to the power supply capacitor.

Specifically, the voltage comparison module 2711 includes: a first voltage division resistor R61, having a first end coupled with the power supply capacitor through the VDD pin of the control circuit; a second voltage division resistor R62, having a first end coupled with a second end of the first voltage division resistor R61 and a second end grounded; a voltage comparator CMP63, having a first input end coupled with a second end of the first voltage division resistor R61 and a first end of the second voltage division resistor R62, a second input end receives the reference voltage VR6, and an output terminal outputting the voltage comparison result; wherein the power supply division voltage is a voltage at which the first voltage division resistor R61 and the second voltage division resistor R62 are coupled.

In some embodiments, the primary connecting module 2712 includes: a third resistor R63, a fourth resistor R64, a first primary NMOS M61 and a second primary NMOS M62. The fourth resistor R64 has a first end coupled with the SW pin of the control circuit 200 and a drain of the second primary NMOS M62, a second end coupled with a drain of the first primary NMOS M61 and a gate of the second primary NMOS M62. A gate of the first primary NMOS M61 is coupled with a first end of the third resistor R63 and an output end of the voltage comparator CMP63. A source of the second primary NMOS M62 is coupled with the VDD pin of the control circuit 200; and a second end of the third resistor R63 and a source of the first primary NMOS M61 are grounded.

In some embodiments, the auxiliary connecting module 2713 includes an auxiliary PMOS P61, an auxiliary NMOS M63, and a fifth resistor R65. The auxiliary PMOS P61 has a source coupled with the DIO pin of the control circuit 200 and a first end of the fifth resistor R65, a drain coupled with the VDD pin of the control circuit 200, and a gate coupled with a second end of the fifth resistor R65 and a drain of the auxiliary NMOS M63. The auxiliary NMOS M63 has a gate coupled with the output end of the voltage comparator CMP63, and a source grounded.

In some embodiments, the voltage comparison module 2711 generates a power supply division voltage according to a voltage on the power supply capacitor (i.e., a voltage at the VDD pin); if the power supply division voltage is less than the reference voltage VR6, the first primary NMOS M61 and the auxiliary NMOS M63 are turned off. Gate voltages of the second primary NMOS M62 and the auxiliary PMOS P61 increase. Therefore, the second primary NMOS M62 is turned on, and the auxiliary PMOS P61 is turned off. The primary winding charges the power supply capacitor through the SW pin of the control circuit 200 and the second primary NMOS M62.

If the power supply division voltage is greater than the reference voltage VR6, the second primary NMOS M62 is turned off, the auxiliary PMOS P61 is turned on, and the auxiliary winding charges the power supply capacitor through the DIO pin of the control circuit 200 and the auxiliary PMOS P61.

Figure 7:
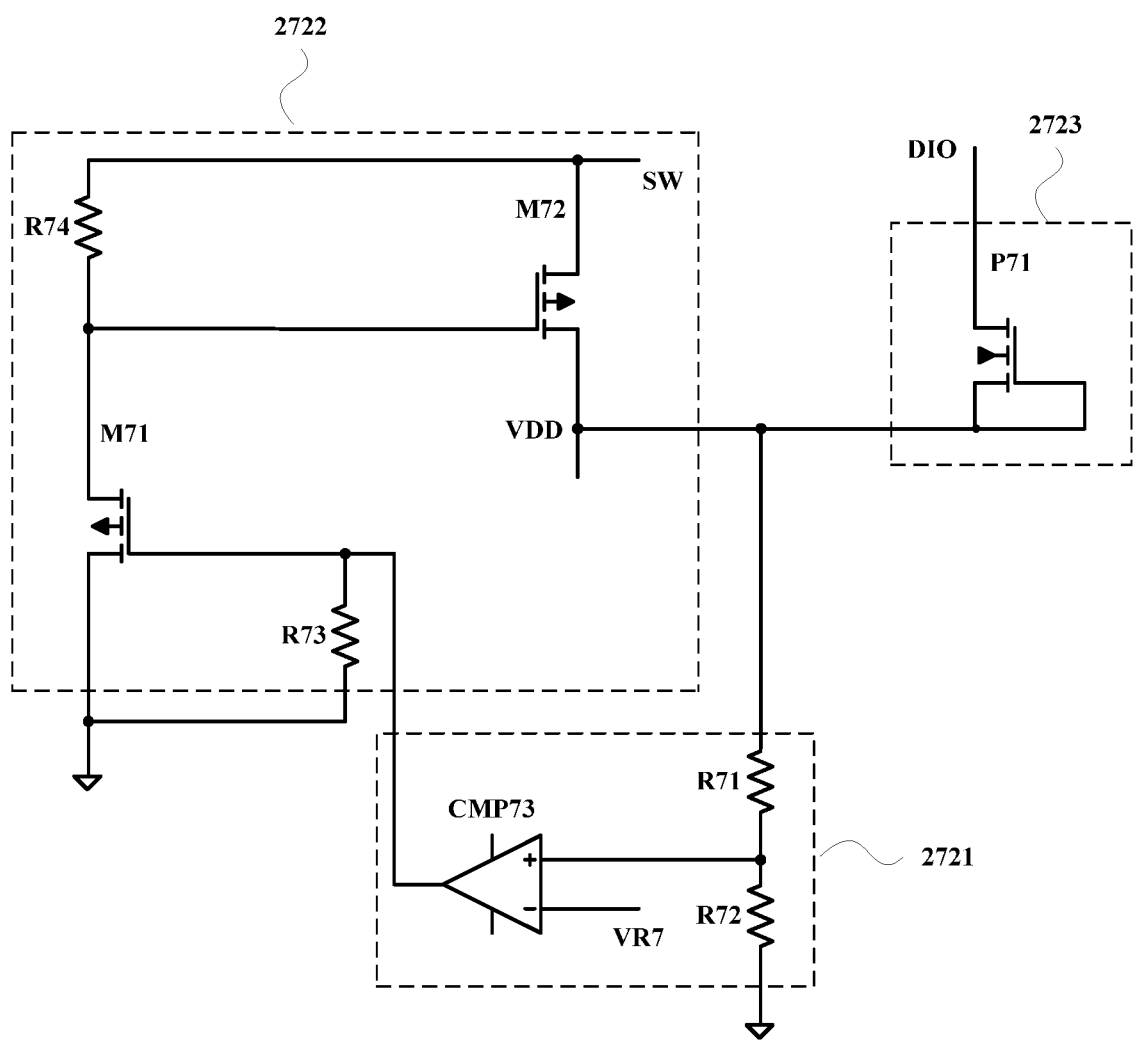
FIG. 7 schematically illustrates a structural diagram of a power supply startup module according to an embodiment of the present disclosure.

Referring to FIG. 7, FIG. 7 schematically illustrates a structural diagram of a power supply startup module according to an embodiment of the present disclosure.

In the embodiment shown in FIG. 7, the power supply startup module 270 is configured to charge the power supply capacitor through the primary winding and the auxiliary winding when the system is started; and is configured to charge the power supply capacitor through the auxiliary winding when the voltage of the power supply capacitance is greater than the chip startup threshold.

The power supply startup module 270 includes a voltage comparing module 2721, a primary connecting module 2722, and an auxiliary connecting module 2723. The voltage comparing module 2721 is configured to generate a power supply division voltage according to a voltage on the power supply capacitor, to compare the power supply division voltage with a reference voltage VR7, and to output a voltage comparison result, when the power supply division voltage is less than the reference voltage VR7, the voltage comparison result is a low level, and when the power supply division voltage is greater than the reference voltage VR7, the voltage comparison result is a high level. The primary connecting module 2722 is turned on when the voltage comparison result is a low level, and connects the primary winding to the power supply capacitor. The auxiliary connecting module 2723 connects the auxiliary winding to the power supply capacitor.

Specifically, the voltage comparison module 2721 includes: a first voltage division resistor R71, a second voltage division resistor R72 and a voltage comparator CMP73.

In some embodiments, the first voltage division resistor R71 has a first end coupled with the power supply capacitor through the VDD pin of the control circuit; the second voltage division resistor R72 has a first end coupled with a second end of the first voltage division resistor R71 and a second end grounded; the voltage comparator CMP73 has a first input end coupled with a second end of the first voltage division resistor R71 and a first end of the second voltage division resistor R72, a second input end receives the reference voltage VR7, and an output terminal outputting the voltage comparison result; wherein the power supply division voltage is a voltage at which the first voltage division resistor R71 and the second voltage division resistor R72 are coupled.

In some embodiments, the primary connecting module 2712 includes: a third resistor R73, a fourth resistor R74, a first primary NMOS M71 and a second primary NMOS M72.

In some embodiments, the fourth resistor R74 has a first end coupled with the SW pin of the control circuit 200 and a drain of the second primary NMOS M72, and a second end coupled with a drain of the first primary NMOS M71 and a gate of the second primary NMOS M72. A gate of the first primary NMOS M71 is coupled with a first end of the third resistor R73 and an output end of the voltage comparator CMP73. A source of the second primary NMOS M72 is coupled with the VDD pin of the control circuit 200; and a second end of the third resistor R73 and a source of the first primary NMOS M71 are grounded.

In some embodiments, the auxiliary connecting module 2723 includes an auxiliary PMOS P71, wherein the auxiliary PMOS P71 has a source coupled with the DIO pin of the control circuit 200, and a gate coupled with a source of the auxiliary PMOS P71 and the VDD pin of the control circuit 200.

In some embodiments, since the gate and the drain of the auxiliary PMOS P71 are coupled, the auxiliary PMOS P71 is always in an on state. If the power supply division voltage is less than the reference voltage VR7, the first primary NMOS M71 is turned off, and a gate voltage of the second primary NMOS M72 increases. Therefore, the second primary NMOS M72 is turned on, and the primary winding and the secondary winding are charged to the power supply capacitor through the SW pin and the DIO pin respectively.

If the power supply division voltage is greater than the reference voltage VR7, the second primary NMOS M72 is turned off, and the auxiliary winding charges the power supply capacitor through the DIO pin of the control circuit 200 and the auxiliary PMOS P71.

Figure 8:
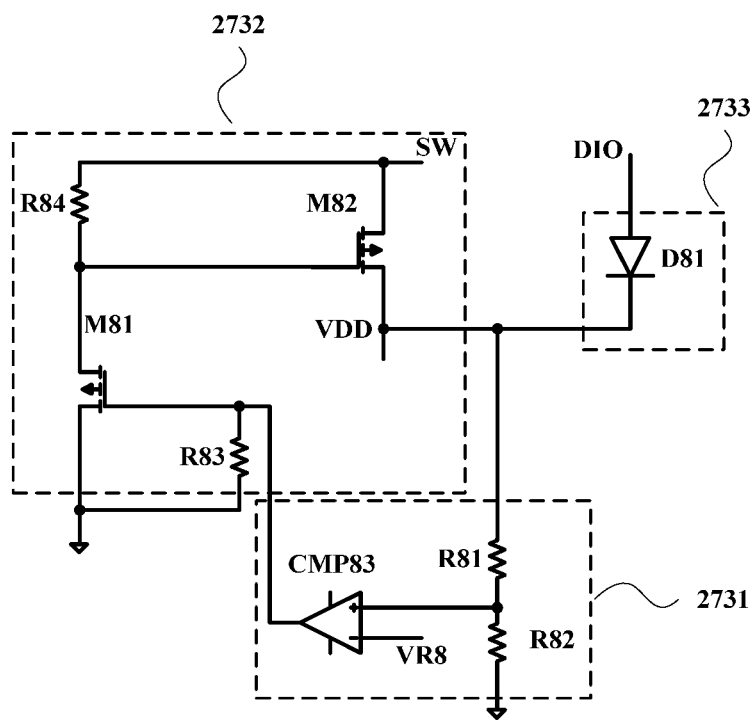
FIG. 8 schematically illustrates a structural diagram of a power supply startup module according to an embodiment of the present disclosure.

FIG. 8 schematically illustrates a structural diagram of a power supply startup module according to an embodiment of the present disclosure.

In the embodiment shown in FIG. 8, the power supply startup module 270 is configured to charge the power supply capacitor through the primary winding and the auxiliary winding when the system is started; and is configured to charge the power supply capacitor through the auxiliary winding when the voltage of the power supply capacitance is greater than the chip startup threshold.

The power supply startup module 270 includes a voltage comparing module 2731, a primary connecting module 2732, and an auxiliary connecting module 2733. The voltage comparing module 2731 is configured to generate a power supply division voltage according to a voltage on the power supply capacitor, to compare the power supply division voltage with a reference voltage VR8, and to output a voltage comparison result, when the power supply division voltage is less than the reference voltage VR8, the voltage comparison result is a low level, and when the power supply division voltage is greater than the reference voltage VR8, the voltage comparison result is a high level. The primary connecting module 2732 is turned on when the voltage comparison result is a low level, and connects the primary winding to the power supply capacitor. The auxiliary connecting module 2723 connects the auxiliary winding to the power supply capacitor.

Specifically, the voltage comparison module 2731 includes: a first voltage division resistor R81, a second voltage division resistor R82 and a voltage comparator CMP83.

In some embodiments, the first voltage division resistor R81 has a first end coupled with the power supply capacitor through the VDD pin of the control circuit; the second voltage division resistor R82 has a first end coupled with a second end of the first voltage division resistor R81 and a second end grounded; the voltage comparator CMP83 has a first input end coupled with a second end of the first voltage division resistor R81 and a first end of the second voltage division resistor R82, a second input end receives the reference voltage VR8, and an output terminal outputting the voltage comparison result; wherein the power supply division voltage is a voltage at which the first voltage division resistor R81 and the second voltage division resistor R82 are coupled.

In some embodiments, the primary connecting module 2712 includes: a third resistor R83, a fourth resistor R84, a first primary NMOS M81 and a second primary NMOS M82.

In some embodiments, the fourth resistor R84 has a first end coupled with the SW pin of the control circuit 200 and a drain of the second primary NMOS M82, a second end coupled with a drain of the first primary NMOS M81 and a gate of the second primary NMOS M82. A gate of the first primary NMOS M81 is coupled with a first end of the third resistor R83 and an output end of the voltage comparator CMP83. A source of the second primary NMOS M82 is coupled with the VDD pin of the control circuit 200; and a second end of the third resistor R83 and a source of the first primary NMOS M81 are grounded.

In some embodiments, the auxiliary connecting module 2733 includes a diode D81 having an anode coupled to the DIO pin of the control circuit 200 and a cathode coupled to the VDD pin of the control circuit 200.

In some embodiments, the diode D81 is in a unidirectional-on state. If the power supply division voltage is less than the reference voltage VR8, the first primary NMOS M81 is turned off, and a gate voltage of the second primary NMOS M82 increases. Therefore, the second primary NMOS M82 is turned on, and the primary winding and the secondary winding are charged to the power supply capacitor through the SW pin and the DIO pin respectively.

If the power supply division voltage is greater than the reference voltage VR8, the second primary NMOS M82 is turned off, and the auxiliary winding charges the power supply capacitor through the DIO pin of the control circuit 200 and the diode D81. The auxiliary connecting module 2733 may be other unidirectional devices.

The power supply startup module 270 shown in FIG. 7 and FIG. 8 can implement a dual winding power supply. In embodiments of the present disclosure, a power supply diode is not required outside the control circuit, and a chip is supplied using the primary winding and the auxiliary winding of the transformer. Therefore, the switching power supply system has a faster startup speed and a stable performance.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

The invention claimed is:

1. A control circuit for a switching power supply system, wherein the switching power supply system comprises a transformer, the transformer comprises a primary winding, a secondary winding and an auxiliary winding, and the control circuit comprises:
   a power switch transistor, configured to control disconnection and conduction of the primary winding of the transformer;
   a primary current sampling module, configured to sample a current of the primary winding to generate a sampling voltage; and
   a voltage stabilization control module, configured to turn on or turn off the power switch transistor according to an input voltage, an output voltage of the switching power supply system, and the sampling voltage;
   wherein the voltage stabilization control module comprises a resistance adjusting module, and the resistance adjusting module comprises:
   a second feedback resistor module, comprising an RC filter circuit and a plurality of lower feedback resistors connected in parallel, wherein each of the plurality of lower feedback resistors is controlled by a resistance control switch; and
   a decoding and encoding module, configured to receive a resistance control signal and output a switch control signal to a plurality of resistance control switches to turn on or off all or part of the plurality of resistance control switches.

2. The control circuit according to claim 1, wherein the primary current sampling module comprises:
   a sampling transistor, in parallel with the power switch transistor, configured to generate a current sampling signal, wherein the current sampling signal is proportional to a current flowing through the power switch transistor; and
   a current detecting module, configured to generate the sampling voltage according to the current sampling signal.

3. The control circuit according to claim 2, wherein the current detecting module comprises:
   a source follow module, coupled with the sampling transistor and configured to generate a sample follow signal according to the current sampling signal; and
   a current mirror, configured to generate the sampling voltage according to the sample follow signal.

4. The control circuit according to claim 1, wherein the voltage stabilization control module comprises:
   a feedback signal detecting module, configured to generate a feedback signal, wherein the feedback signal is related to the output voltage of the switching power supply system; and
   a turn-off duration calculating module, configured to calculate an off-time duration of the power switch transistor according to an output of the feedback signal detecting module and an off-time point of the power switch transistor.

5. The control circuit according to claim 4, wherein the feedback signal detecting module further comprises:
   the resistance adjusting module, configured to generate the feedback signal by adjusting a resistance value connected into the feedback signal detecting module according to the resistance control signal when the power switch transistor is turned off, wherein the feedback signal is related with the output voltage of the switching power supply system, and the feedback signal is corresponding to the resistance control signal.

6. The control circuit according to claim 5, wherein the feedback signal detecting module further comprises:
   an input feedback module, configured to output an input voltage follow signal when the power switch transistor is turned on, wherein the input voltage follow signal is related to the input voltage of the switching power supply system.

7. The control circuit according to claim 1, further comprising:
   a power supply startup module, configured to charge a power supply capacitor in the switching power supply system through the primary winding, or configured to charge the power supply capacitor through the primary winding and the auxiliary winding when the switching power supply system starts; and configured to charge the power supply capacitor through the auxiliary winding of the transformer when a voltage of the power supply capacitor is greater than a chip startup threshold.

8. The control circuit according to claim 7, wherein the power supply startup module comprises:
   a voltage comparing module, configured to generate a power supply division voltage according to a voltage on the power supply capacitor, to compare the power supply division voltage with a reference voltage, and to output a voltage comparison result;
   a primary connecting module, configured to connect the primary winding to the power supply capacitor according to the voltage comparison result; and
   an auxiliary connecting module, configured to connect the auxiliary winding to the power supply capacitor according to the voltage comparison result.

9. A switching power supply system, comprising:
   a transformer, comprising a primary winding, an auxiliary winding and a secondary winding, configured to perform a voltage-convert on an input voltage from the primary winding, and output an output voltage through the secondary winding;
   wherein the switching power supply system further comprises:
   the control circuit according to claim 1, configured to control the conduction and disconnection of the primary winding of the transformer such that the switching power supply system outputs at a constant voltage.

* * * * *